US011816685B2

(12) United States Patent
Piotrowski et al.

(10) Patent No.: US 11,816,685 B2
(45) Date of Patent: Nov. 14, 2023

(54) METHODS AND APPARATUS TO GENERATE CONSUMER DATA

(71) Applicant: THE NIELSEN COMPANY (US), LLC, New York, NY (US)

(72) Inventors: Frank W. Piotrowski, Arlington Heights, IL (US); Julie F. Banks, Palatine, IL (US); Kyle T. Poppie, Arlington Heights, IL (US); Ryan Koralik, Elk Grove Village, IL (US)

(73) Assignee: The Nielsen Company (US), LLC, New York, NY (US)

( * ) Notice: Subject to any disclaimer, the term of this patent is extended or adjusted under 35 U.S.C. 154(b) by 76 days.

(21) Appl. No.: 17/099,320

(22) Filed: Nov. 16, 2020

(65) Prior Publication Data

US 2021/0166249 A1 Jun. 3, 2021

Related U.S. Application Data

(63) Continuation of application No. 16/266,963, filed on Feb. 4, 2019, now Pat. No. 10,839,407, which is a (Continued)

(51) Int. Cl.
*G06Q 30/02* (2023.01)
*G06Q 30/0201* (2023.01)
(Continued)

(52) U.S. Cl.
CPC ....... *G06Q 30/0201* (2013.01); *G06Q 20/389* (2013.01); *G06Q 30/0204* (2013.01);
(Continued)

(58) Field of Classification Search
CPC .......... G06Q 30/0201; G06Q 30/0226; G06Q 30/0204; G06Q 20/0389; G06Q 30/0205; G06Q 30/0211; G06Q 30/0236
See application file for complete search history.

(56) References Cited

U.S. PATENT DOCUMENTS 7,406,436 B1 7/2008 Reisman
8,392,254 B2 3/2013 Pradeep et al.
(Continued)

OTHER PUBLICATIONS

United States Patent and Trademark Office, "Non-Final Office Action," issued in connection with U.S. Appl. No. 14/942,024, dated Feb. 16, 2018, 9 pages.
(Continued)

*Primary Examiner* — David J Stoltenberg

(57) ABSTRACT

Methods and apparatus to generate consumer data are disclosed. An example method of selecting a sample of transaction data corresponding to a membership program includes defining a first type of member of the membership program; defining a second type of member of the membership program; calculating, via a processor, a target for the sample; selecting, via the processor, a first portion of the transaction data for the first type of member in accordance with the target; generating, via the processor, an updated target by recalculating the target with the first portion of the transaction data removed from consideration; and selecting, via the processor, a second portion of the transaction data for the second type of member in accordance with the updated target.

20 Claims, 9 Drawing Sheets

Related U.S. Application Data continuation of application No. 14/942,024, filed on Nov. 16, 2015, now Pat. No. 10,235,684.

(60) Provisional application No. 62/141,246, filed on Mar. 31, 2015.

(51) Int. Cl.
  *G06Q 30/0211* (2023.01)
  *G06Q 30/0226* (2023.01)
  *G06Q 30/0204* (2023.01)
  *G06Q 20/38* (2012.01)
  *G06Q 30/0207* (2023.01)

(52) U.S. Cl.
  CPC ..... *G06Q 30/0205* (2013.01); *G06Q 30/0211* (2013.01); *G06Q 30/0226* (2013.01); *G06Q 30/0236* (2013.01)

(56) References Cited

U.S. PATENT DOCUMENTS

| | | | |
|---|---|---|---|
| 8,688,516 | B2 | 4/2014 | Shimizu et al. |
| 10,235,684 | B2 | 3/2019 | Piotrowski et al. |
| 10,839,407 | B2 | 11/2020 | Piotrowski et al. |
| 2001/0051895 | A1* | 12/2001 | Giuliani ................ G06Q 40/00 705/14.13 |
| 2005/0222906 | A1* | 10/2005 | Chen ................ G06Q 30/0224 705/14.27 |
| 2006/0293960 | A1* | 12/2006 | Iannacci ................ G06Q 30/02 705/14.36 |
| 2007/0087756 | A1 | 4/2007 | Hoffberg |
| 2008/0262925 | A1* | 10/2008 | Kim ................ G06N 20/00 705/14.27 |
| 2008/0319829 | A1 | 12/2008 | Hunt et al. |
| 2009/0299824 | A1 | 12/2009 | Barnes, Jr. |
| 2011/0295722 | A1 | 12/2011 | Reisman |
| 2012/0005213 | A1* | 1/2012 | Hannan ................ G06Q 30/02 707/741 |
| 2012/0130771 | A1 | 5/2012 | Kannan et al. |
| 2012/0278328 | A1 | 11/2012 | Samson et al. |
| 2014/0188554 | A1 | 7/2014 | Harter et al. |
| 2015/0170175 | A1 | 6/2015 | Zhang et al. |
| 2016/0292698 | A1 | 10/2016 | Piotrowski et al. |
| 2019/0266620 | A1 | 8/2019 | Piotrowski et al. |

OTHER PUBLICATIONS

United States Patent and Trademark Office, "Notice of Allowance and Fee(s) Due," issued in connection with U.S. Appl. No. 14/942,024, dated Oct. 16, 2018, 15 pages.

United States Patent and Trademark Office, "Non-Final Office Action," issued in connection with U.S. Appl. No. 16/266,963, dated Mar. 6, 2020, 6 pages.

United States Patent and Trademark Office, "Notice of Allowance and Fee(s) Due," issued in connection with U.S. Appl. No. 16/266,963, dated Jul. 8, 2020, 10 pages.

Liu, Yuping, "The Long-Term Impact of Loyalty Programs on Consumer Purchase Behavior and Loyalty," Journal of Marketing, Oct. 2007, vol. 71, issue 4, 17 pages.

Clifton, Christopher, "Using Sample Size to Limit Exposure to Data Mining," Journal of Computer Security, Dec. 2000, vol. 8, issue 4, 26 pages.

* cited by examiner

METHODS AND APPARATUS TO GENERATE CONSUMER DATA

RELATED APPLICATION

This patent arises from a continuation of U.S. patent application Ser. No. 16/266,963, now U.S. Pat. No. 10,839,407, filed Feb. 4, 2019, which is a continuation of U.S. patent application Ser. No. 14/942,024, now U.S. Pat. No. 10,235,684, filed Nov. 16, 2015, which claims the benefit of U.S. Provisional Application Ser. No. 62/141,246, filed on Mar. 31, 2015, entitled "Method and Apparatus to Generate Consumer Data," which are hereby incorporated by reference in their entireties. Priority to U.S. patent application Ser. No. 16/266,963, U.S. patent application Ser. No. 14/942,024, and U.S. Provisional Application Ser. No. 62/141,246 is hereby claimed.

FIELD OF THE DISCLOSURE

This disclosure relates generally to consumer research and, more particularly, to methods and apparatus to generate consumer data.

BACKGROUND

In some consumer market research systems, groups of panelists agree to passively and/or actively submit information about their demographics and/or their behavior to a data collection entity that uses the information to develop reports about populations of interest. The information submitted by the panelist may include data related to, for example, purchased products, media exposure, demographics (e.g., age, gender, race, income, home location, occupation, etc.) advertisement exposure, etc. The data collected from the panelists can be extrapolated to provide estimations of behaviors of a broader population, such as a demographic group sharing certain traits with the panelists. The data collection entity, or some other entity with access to the submitted information, typically generates reports using the submitted information and/or the extrapolated estimations and provides the reports and/or the data to, for example, providers of goods and services that advertise to targeted audiences.

DETAILED DESCRIPTION

Figure 1:
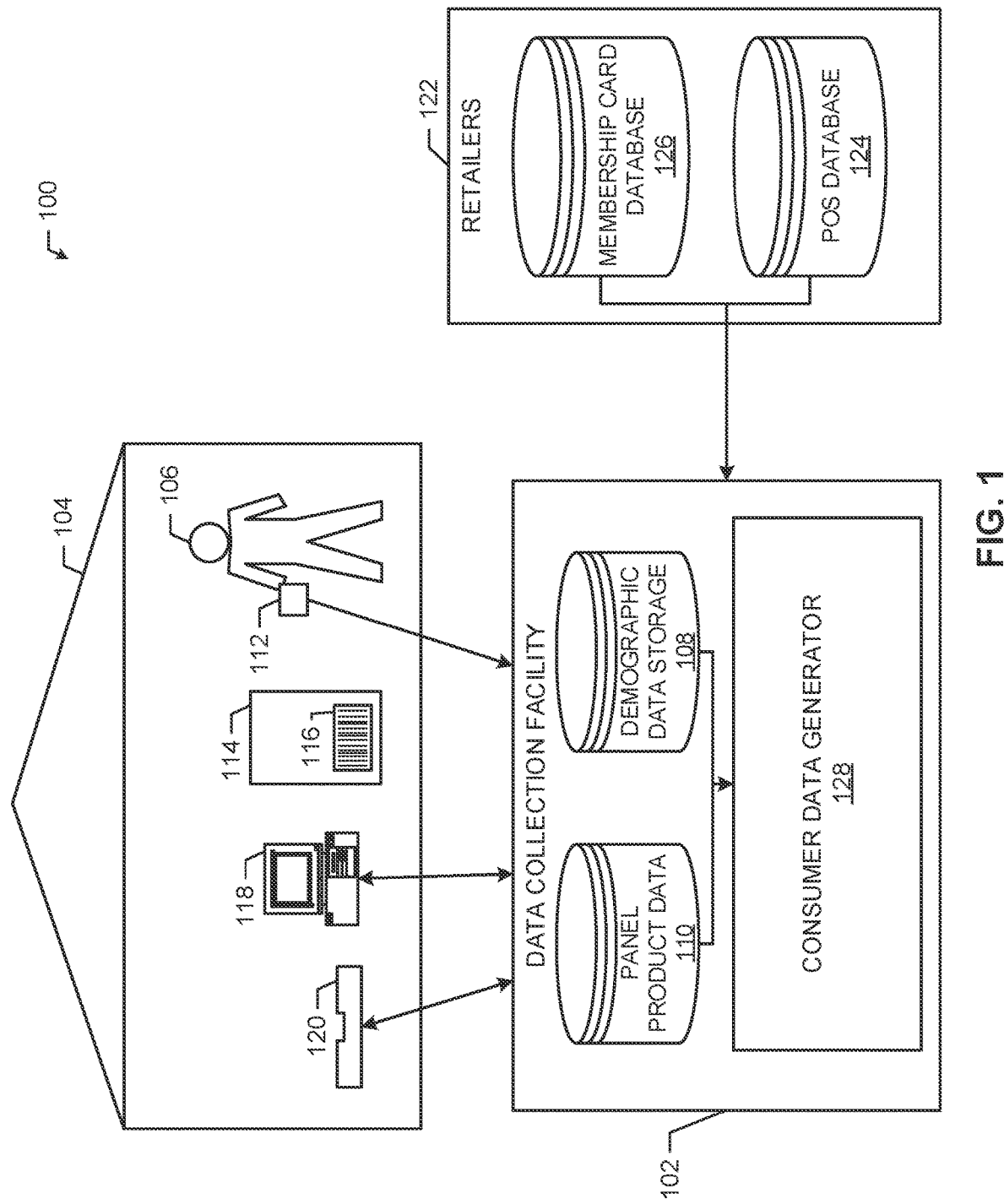
FIG. 1 is an illustration of an example consumer research system including a consumer data generator constructed in accordance with teachings of this disclosure.

FIG. 1 is a schematic illustration of an example market research system 100 including a data collection facility 102. The example data collection facility 102 of FIG. 1 collects panel data from a plurality of panelists who have agreed to actively and/or passively submit data to the data collection facility 102. In the example of FIG. 1, a household 104 including a panelist 106 is illustrated. However, multiple panelists and households provide panel data to the example data collection facility of FIG. 1. In the illustrated example of FIG. 1, the panelist 106 is a member of a panel (e.g., a Nielsen Homescan® panel) that has agreed to scan codes (e.g., barcodes such as traditional barcodes, tag barcodes, QR codes, etc.) of obtained (e.g., purchased) merchandise using a scanning device (e.g., a barcode scanner) provided by an entity (e.g., The Nielsen Company) associated with the example data collection facility 102. However, other types of panels (e.g., television panels, radio panels, Internet panels, etc.) to measure additional or other activities may likewise be employed.

The household 104 and/or the panelist 106 may be statistically selected (e.g., by the entity operating the data collection facility 102) according to, for example, one or more demographic factors, geographic location, answers provided in response to a survey, previous purchase behavior, etc. In the example of FIG. 1, the data collection facility 102 includes demographic information associated with the household 104 and the panelist 106. In some examples, the demographic information of the household 104 and/or the demographic information of the panelist are represented by a profile generated by the entity managing the data collection facility 102. For example, the demographic profile of the household 104 may include an age profile, a geographic location profile, a household income profile, etc. Information representative of such characteristics of the household 104 and/or the panelist 106 is referred to herein as panelist profile data and may be stored in demographic data storage 108 at the data collection facility 102. Demographic data storage 108 may also be used to store other types of demographic data, for example regional demographic data, a demographic data repository and the like, as describe further below.

In the illustrated example of FIG. 1, the panelist 106 has agreed to submit information related to obtained items (e.g., purchased products) to the data collection facility 102. Information representative of the obtained items that is provided to that data collection facility 102 is referred herein as panel product data 110, which is stored at the data collection facility 102. In the example of FIG. 1, the panel product data 110 includes information representative of, for example, products obtained by a single household member (e.g., the panelist 106), the household as a whole, and/or any subset of household members (e.g., children, parents, males, females, an eldest child, etc.) and point of sale data (e.g., retailer name and address, wholesaler name and address, etc.). Furthermore, the panel product data 110 submitted to the data collection facility 102 includes, for example, any type of products, a designated type of product (e.g., groceries, clothing, media (e.g., music or movies), electronics, housekeeping products, home improvement products, etc.), a designated brand, and/or a plurality of types of products.

The panelist 106 conveys the panel product data 110 to the data collection facility 102 in any suitable manner. In the illustrated example of FIG. 1, the panelist 106 is provided with a scanner 112 (e.g., a barcode scanner) that is adapted to collect data (e.g., via the barcode reader) and to communicate the collected data to the data collection facility 102 either directly and/or via a network (e.g., a local-area network, a wide-area network, a metropolitan-area network, the Internet, the Plain Old Telephone System (POTS), a digital subscriber line (DSL) network, a cable network, a power line network, a wireless communication network, a wireless mobile phone network, a Wi-Fi network, and/or a satellite network).

After purchasing and/or otherwise obtaining a product 114, the panelist 106 uses the example scanner 112 to scan identifying information 116 on the product 114. In the illustrated example of FIG. 1, the identifying information 116 on the product 114 is a barcode. However, any type of identifying information may be utilized. For example, the scanner 112 may be provided with a key pad or other user device to enable the user to manually enter the product information (e.g., product name, point of sale, etc.). The identifying information 116 is unique to the product 114, such that the product 114 is identifiable using data obtained from the identifying information 116. For example, the identifying information 116 corresponds to a SKU (stockkeeping unit) associated with the product 114. The example scanner 112 of FIG. 1 electronically stores data corresponding to the scanned identifying information 116 in a memory.

The example scanner 112 of FIG. 1 transmits (e.g., periodically, after scanning new information, and/or in response to an event or prompt) the stored panel product data corresponding to the identifying information 116 to the data collection facility 102 in any suitable manner. In some examples, the scanner 112 includes a wireless communication module (e.g., a cellular module) capable of wirelessly transmitting stored data to the data collection facility 102. In some examples, the scanner 112 is coupled to a personal computer 118, which is in communication with the data collection facility 102 (e.g., via a wired and/or wireless network). In some examples, the scanner 112 is coupled to a docking station 120, which is in communication with the data collection facility 102 (e.g., via a wired, a wireless network, and/or via the personal computer 118), and which may charge the scanner 112. While the example of FIG. 1 includes the personal computer 118 and the docking station 120, any other type of device capable of interacting with the scanner 112 to transmit the stored data to the data collection facility 102 may be employed. The scanner 112 may be able to use one, some, or all of these communication technologies.

In addition to the product panel data received from the household 104, the example data collection facility 102 of FIG. 1 receives data representative of transactions occurring at retailers 122. In the example of FIG. 1, the retailers 122 collect and store transaction data in a point of sale (POS) database 124. The information stored in the POS database 124 includes POS data related to purchases made via the retailers 122 such as, for example, time and date of purchase, product identifying information, retailer identifying information, location identifying information, etc.

In the example of FIG. 1, the retailers 122 implement membership programs for which people can register. As used herein, the terms membership and membership program refer to any suitable type of program for which consumers actively register with a retailer to create a persistent shopper ID, or a retailer creates a persistent shopper ID using transactional data available to the retailer (e.g., this may include using a traceable tender as opposed to a membership ID). Examples include: programs that requires a fee, programs that do not require a fee, programs that require and/or request use of a card when making purchases, programs that do not require or request use of a card when making purchases, programs that make use of a traceable tender (e.g., a retailer associating a particular credit or debit card to a persistent shopper ID), etc. In some examples, the membership programs reward registered people when those people use, for example, a card or code when making a purchase. In some instances, the membership programs are referred to as loyalty programs, the cards used by registered people are referred to herein as loyalty cards, and the data associated with the transactions involving the loyalty cards is referred to herein as loyalty data. In the illustrated example, the retailers 122 collect and store membership card data in a membership card database 126.

The information stored in the membership card database 126 includes data related to purchases made at the retailers 122 by holders of membership cards associated with, for example, the membership programs offered and/or administered by the retailers 122. For example, the membership card database 126 includes information representative of purchases made by a person and/or household registered with a membership program offered by a grocery store. When the registered person and/or household makes a purchase at the grocery store, data representative of the purchase is tagged as membership card data and stored in the membership card database 126.

In the illustrated example of FIG. 1, the retailers 122 provide the data collection facility 102 with access to the POS database 124 and the membership card database 126. For example, the retailers 122 may enable the data collection facility 102 to retrieve information via direct access, enable the data collection facility 102 to submit queries to the POS database 124 and/or the membership card database 126, and/or may implement any other suitable access arrangement.

As disclosed in detail below, the example data collection facility 102 of FIG. 1 includes a consumer data generator 128 constructed in accordance with teachings of this disclosure. The example consumer data generator 128 of FIG. 1 selects a sample from the membership card data, combines the panel product data 110 and the membership card data to generate fused datasets, generates projections based on the fused datasets, and updates linkages used to generate the fused dataset.

Figure 2:
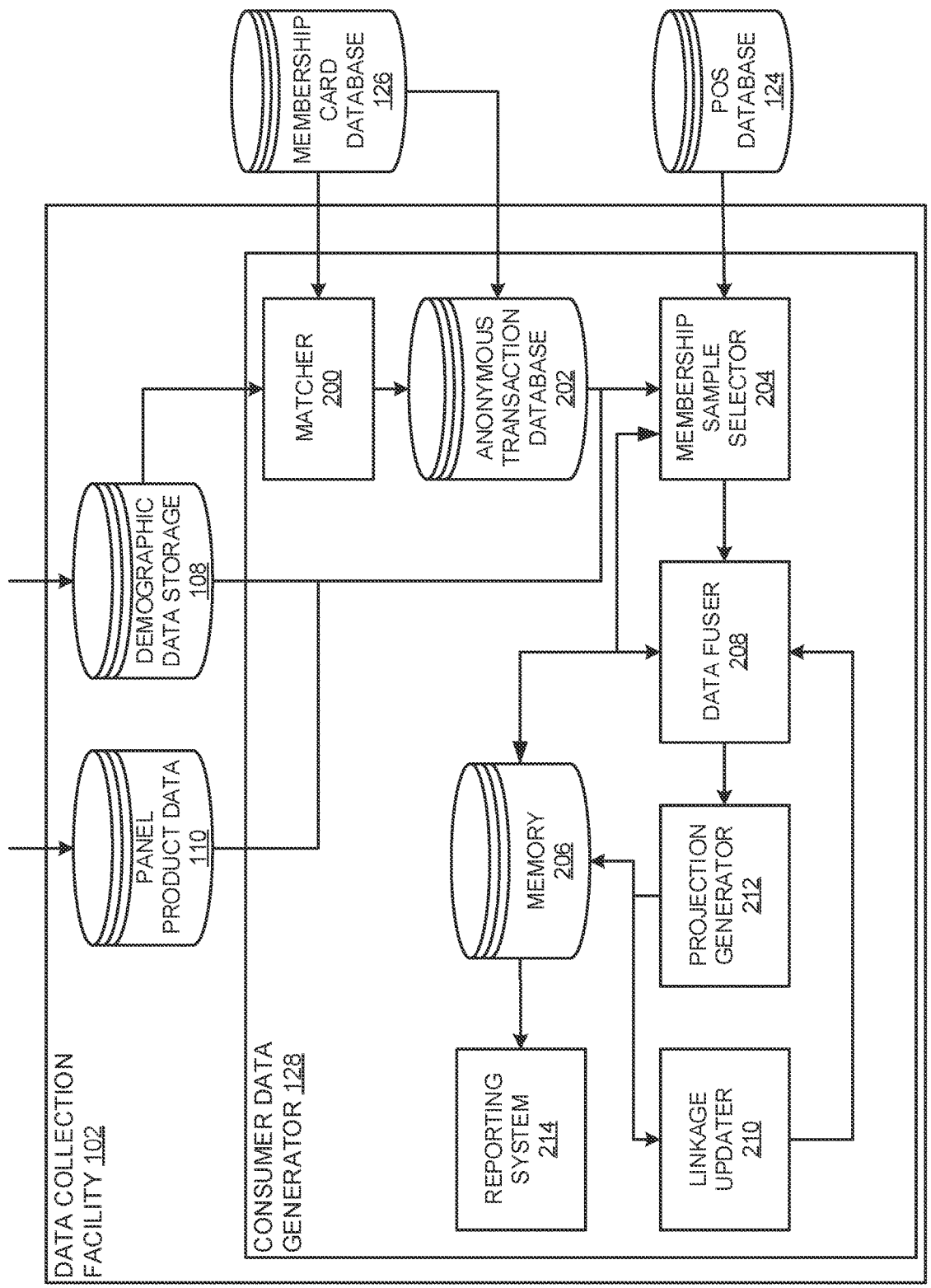
FIG. 2 is a block diagram showing additional detail of an example implementation of the example consumer data generator of FIG. 1.

FIG. 2 is a block diagram of an example implementation of the example consumer data generator 128 of FIG. 1. In the example of FIG. 2, user identifying information from the membership card database 126 is provided to a matcher 200. The user identifying information provided to the matcher 200 includes names and addresses of membership card holders. The example matcher 200 of FIG. 2 queries a demographic data repository (e.g., a collection of demographic profiles each known to correspond to a particular address) with the addresses of the user identifying information. In some examples, the demographic data repository is stored in demographic data storage 108. Additionally, the example matcher 200 of FIG. 2 assigns an anonymous household-level identifier to each of the households that are membership cardholders. The example matcher 200 appends the demographic profile of household retrieved from the demographic data repository to the corresponding anonymous household-level identifier. In some examples, the matcher 200 links together households that shop in more than one of the membership retailers. Accordingly, the example matcher 200 of FIG. 2 creates entries in an anonymous transaction database 202 of FIG. 2 that have an anonymous identifier and demographic profile(s), but do not include personally identifying information (e.g., names). The anonymous transaction database 202 stores transaction data from the membership card database 126 and the example matcher 200 assigns the anonymous household-level identifier to the transaction data.

In the example of FIG. 2, the anonymous transaction database 202 receives transaction data from the membership card database 126. The transaction data represents actual purchase information and the corresponding anonymous identifiers. Using the identifiers to link the purchase information with the entries created by the matcher 200, the anonymous transaction database 202 is populated with purchase information and the associated anonymous household-level identifier.

In the example of FIG. 2, the information of the anonymous transaction database 202 is provided to a membership sample selector 204 of the example consumer data generator 128. The example membership sample selector 204 of FIG. 2 uses the information from the anonymous transaction database 202, point of sale (POS) data 124, demographic data storage 108, and panel product data 110 to generate a sample of the membership card data provided by the example retailers 122 of FIG. 1. In some examples the sample of the membership card data is stored in memory, for example memory 206. In particular, the example membership sample selector 204 selects the sample of the membership card data such that the sample is representative of a total shopper universe, rather than only membership cardholders. The operation of the example membership sample selector 204 is disclosed in detail below in connection with FIG. 3A.

The example consumer data generator 128 of FIG. 2 includes a data fuser 208 to integrate the membership card data of the generated membership sample with the panel product data 110 provided by the panelist 106 (and other panelists of, for example, a Nielsen Homescan® panel). The fusion of the membership card data and the panel product data performed by the example data fuser 208 of FIG. 2 involves supplementing membership card data associated with particular characteristics (e.g., demographics) with panel product data associated with the same or similar characteristics (e.g., demographics). The panel product data associated with the same or similar characteristics provides information regarding purchasing activity at a plurality of retailers, rather than the single-retailer information provided by the membership data. Accordingly, the example data fuser 208 of FIG. 2 attributes the panel product data to the membership card data according to one or more linkages between the two datasets. For example, membership card data associated with a 35 year old Caucasian who resides in Chicago, Ill., is fused with panel product data associated with other 35 year old Caucasians who reside in Chicago, Ill., such that the panel product data is projected onto the membership card data. In particular, the panel product data associated with the other 35 year old Caucasians who reside in Chicago, Ill., includes information related purchases made at a plurality of different retailers, while the membership card data for a particular retailer includes information related to purchases made at that retailer. As such, the dataset generated by the example data fuser 208 of FIG. 2 expands the membership card data, which, by itself reflects purchases at one retailer, to be representative of purchasing behavior at multiple retailers. The example data fuser 208 is disclosed in detail below in connection with FIGS. 4 AND 5.

The example consumer data generator 128 of FIG. 2 includes a linkage updater 210 to maintain and/or improve result(s) of the fusion performed by the example data fuser 208. The example linkage updater 210 of FIG. 2 periodically evaluates newly available information of the panel product data 110 provided by the panelist 106 and other panelists to determine whether improved linkages (e.g., demographic linkages) between the members of the panel and the membership card users are available. If such information is available, the example linkage updater 210 of FIG. 2 triggers the data fuser 208 to perform an updated fusion of the panel product data 110 and the membership card data, thereby maintaining and/or improving the performance of the data fusion. Operation of the example linkage updater 210 is disclosed in detail below in connection with FIG. 6.

The example consumer data generator 128 of FIG. 2 includes a projection generator 212 to generate one or more projections using the data provided by the example data fuser 208. The projection(s) generated by the example projection generator 212 tailor (e.g., weight) the fused dataset according to, for example, expected market share information. Additionally, the example projection generator 212 of FIG. 2 stratifies the fused dataset to include one or more stratifications such as, for example, membership and non-membership strata. Thus, the example projection generator 212 of FIG. 2 generates an enhanced version of the fused dataset generated by the data fuser 208. The example projection generator 212 of FIG. 2 may store the enhanced version of the fused dataset in memory, for example memory 206. Operation of the example projection generator 212 is disclosed in detail below in connection with FIG. 7.

In the example of FIG. 2, the projection generator 212 provides an enhanced fused dataset to a reporting system 214, for example, by storing the enhanced fused dataset into memory 206. The example reporting system 214 provides accessibility to the enhanced fused dataset. In some examples, the reporting system 214 conditions, formats, and/or customizes the raw data of the enhanced fused dataset to provide a user-friendly presentation of the information.

While an example manner of implementing the consumer data generator 128 of FIG. 1 is illustrated in FIG. 2, one or more of the elements, processes and/or devices illustrated in FIG. 2 may be combined, divided, re-arranged, omitted, eliminated and/or implemented in any other way. Further, the example matcher 200, the example membership sample selector 204, the example data fuser 208, the example linkage updater 210, the example projection generator 212, the example reporting system 214 and/or, more generally, the example consumer data generator 128 of FIG. 2 may be implemented by hardware, software, firmware and/or any combination of hardware, software and/or firmware. Thus, for example, any of the example matcher 200, the example membership sample selector 204, the example data fuser 208, the example linkage updater 210, the example projection generator 212, the example reporting system 214 and/or, more generally, the example consumer data generator 128 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the appended claims to cover a purely software and/or firmware implementation, at least one of the example matcher 200, the example membership sample selector 204, the example data fuser 208, the example linkage updater 210, the example projection generator 212, the example reporting system 214 and/or, more generally, the example consumer data generator 128 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example consumer data generator 128 of FIG. 1 may include one or more elements, processes and/or devices in addition to, or instead of, those illustrated in FIG. 2, and/or may include more than one of any or all of the illustrated elements, processes and devices.

Figure 3A:
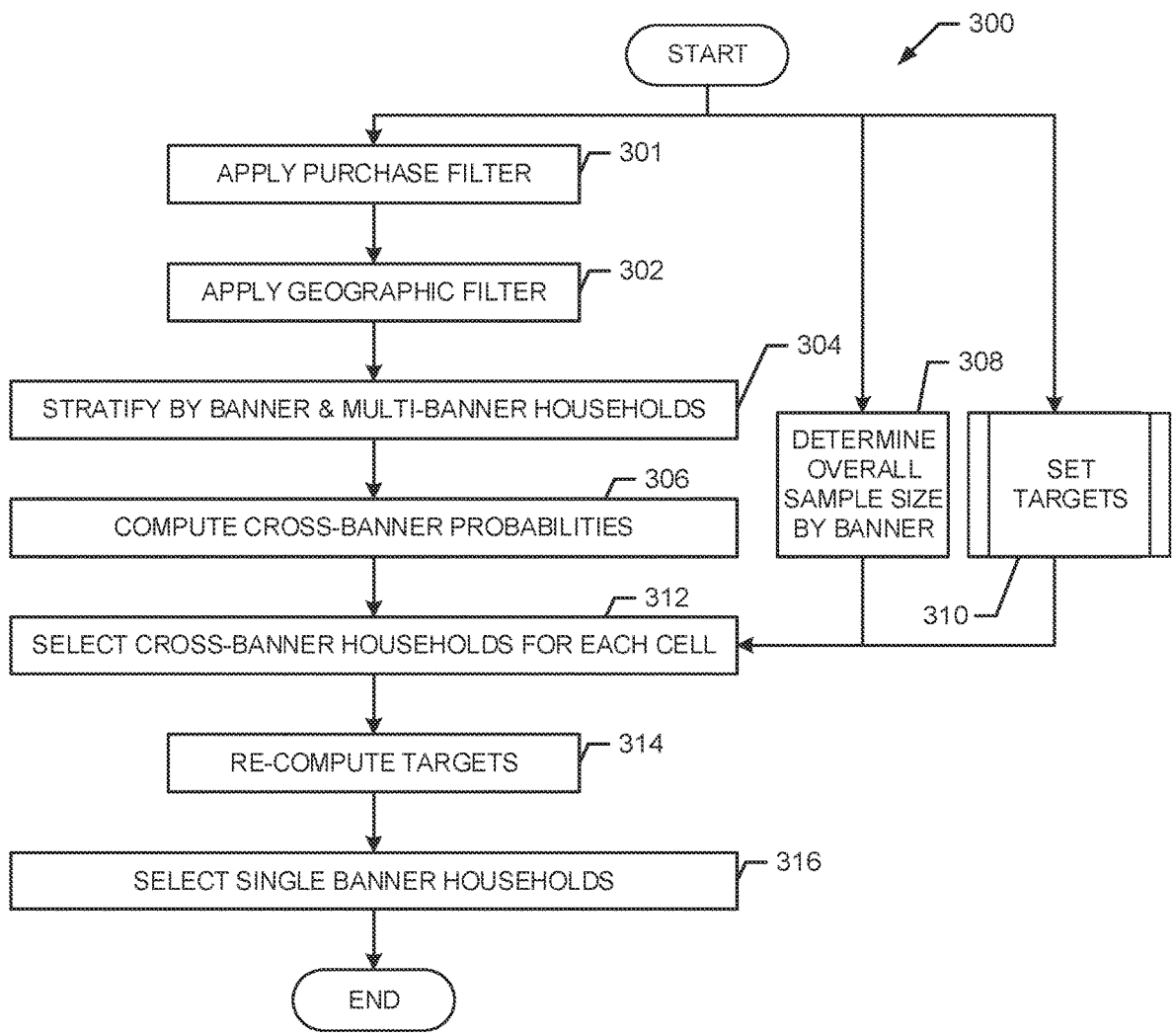
FIG. 3A is a flowchart representative of machine readable instructions that may be executed to implement the example membership sample selector of FIG. 2.

FIG. 3A is a flowchart representative of machine readable instructions for implementing a process 300 of the example membership sample selector 204 of FIG. 2. The example membership sample selector 204 of FIG. 2 uses membership data from the anonymous transaction database 202, the POS data in the POS database 124, regional demographic data stored in the demographic data storage 108, and the panel product data 110 to generate the membership sample. In some examples, the example membership sample selector 204 stores the membership sample in memory, for example memory 206. The example membership sample selector 204 of FIG. 2 generates the membership sample such that the membership sample is representative of membership card holders as well as shoppers that do not have a membership card.

In the example of FIG. 3A, the membership sample selector 204 of receives membership card data from the anonymous transaction database 202 of FIG. 2. As described above, the membership card data from the anonymous transaction database 202 includes data representative of transactions involving a membership card and includes information indicative of, for example, a location of the corresponding transaction and/or demographic information associated with the transaction. In the example of FIG. 3A, the membership sample selector 204 applies a purchase filter to the membership card data to eliminate certain transactional data from consideration for the membership sample (block 301). In the illustrated example, the purchase filter identifies and filters out membership card data corresponding to households that do not use the corresponding membership card, households that do not use the corresponding membership card at a threshold frequency, and/or households that do not use the corresponding membership card for a threshold amount of purchases as measured by dollars. As such, the example the membership sample selector 204 of FIG. 3A directs the membership sample toward repeat shoppers and/or repeat shopping households, rather than people that have the card but do not use the card or barely use the card.

In the example of FIG. 3A, the membership sample selector 204 applies a geographic filter to the membership card data to eliminate certain transactional data from consideration for the membership sample (block 302). In the illustrated example, the geographic filter identifies and filters out membership card data corresponding to transactions outside a particular geographic region that likely correspond to card holders that have moved from the known address that was used to register with the membership card program. In some examples, the geographic area is defined according to a location of the corresponding retailer. For example, transactions occurring in the geographical county of the corresponding retailer and/or adjacent counties. Accordingly, the example the membership sample selector 204 of FIG. 3A enables the membership sample to include data for which the corresponding address is known and/or confirmed.

In the example of FIG. 3A, the membership sample selector 204 stratifies the membership card data according single banner and multi-banner households (block 304). In the example of FIG. 3A, the stratification performed by the membership sample selector 204 includes creating separate datasets according to whether the corresponding household is a single banner household or a multi-banner household. As used herein, a banner refers to an identifier for a retailer that corresponds to a sign (e.g., a physical sign or an electronic display item) display that a shopper views when visiting (e.g., physically and/or electronically) a retailer. For example, some households buy groceries at a single banner, while other household buy groceries at more than one banner. In the illustrated example, the membership sample selector 204 creates the different datasets while requiring distinct sampling rates based on differing proportions of membership records relative to a total shopper universe. In some examples, membership sample selector 204 of FIG. 3A is aware of probably distributions across a population according to single banner and multi-banner households and the stratification performed by the membership sample selector 204 includes tailoring the membership card data according to those distributions or sampling rates. That is, the example membership sample selector 204 of FIG. 3A requires the membership sample to adhere to expected and/or known distributions of single banner and multi-banner households by, for example, requiring the membership sample to include a certain percentage of single banner households and/or a certain percentage of multi-banner households.

In the example of FIG. 3A, the membership sample selector 204 computes cross-banner probabilities such that the membership sample is representative of likelihoods of households being cross-banner households (block 306). For example, the membership sample selector 204 identifies combinations of retailer banners that show purchasing across common households in a population (e.g., a shopper universe). The computation of the cross-banner probabilities enables the membership sample to appropriately represent population proportions for shoppers frequenting more than one participating banner.

In the example of FIG. 3A, the membership sample selector 204 utilizes the POS database 124 to determine an overall sample size according to banner information (block 308). In the illustrated example, the membership sample selector 204 uses the POS database 124 to supplement distribution selection for the membership sample when, for example, an insufficient amount of data (e.g., below a threshold amount of transactions) is available in the membership card data for one or more categories. In particular, the POS database 124 provides purchase information regarding all purchases (e.g., at a particular banner) and indicates how much category spend occurred in particular categories. Thus, when a random sample selection would result in the membership card data over- or under-representing one or more of the categories, the POS database 124 is used to determine an appropriate selection of households to achieve representativeness of category purchasing for each participating retailer banner.

In the example of FIG. 3A, the membership sample selector 204 uses regional demographic data, the POS data, and the panel product data 110 to set one or more targets for the membership sample (block 310). The targets may include demographic targets, geographic targets, department and/or category targets, and/or purchasing behavior targets. The setting of the targets is describe below with respect to FIG. 3B In the example of FIG. 3A, with the membership data filtered and the sample sizes selected (blocks 300-308) and the targets defined (block 310), the membership sample selector 204 selects cross-banner households for the membership sample in accordance with the corresponding sample sizes and the corresponding targets (block 312). As described above, the membership data is stratified and the example membership sample selector 204 of FIG. 3A selects the cross-banner households such that each stratum within each retailer banner is appropriately represented in the membership sample. Additionally, the selection of the cross-banner households performed by the example membership sample selector 204 of FIG. 3A optimizes distances to the corresponding demographic targets, the corresponding geographic targets, the corresponding department and/or category targets, and/or the corresponding purchasing behavior targets. In the example of FIG. 3A, the selected the cross-banner households (e.g., membership card holders from the membership data) are added to the membership sample.

In the example of FIG. 3A, the membership sample selector 204 uses the selection of the cross-banner households to re-compute the targets determined in blocks 312 such that different targets are used for a selection of single banner households (block 314). That is, the example membership sample selector 204 of FIG. 3A recalculates the demographic targets, the geographic targets, the department and/or category targets, and/or the purchasing behavior targets with the households selected to fulfill the cross-banner strata being removed from the consideration of the targets. Thus, the updated targets are based on the membership card data less the membership card data selected for the cross-banner households at block 308.

In the example of FIG. 3A, the membership sample selector 204 selects the single banner households such that each stratum within each banner is appropriately represented in the membership sample (block 316). The example membership sample selector 204 of FIG. 3A merges the single banner selections and the cross-banner selections to generate the membership sample. In some examples, the example membership sample selector 204 of FIG. 3A stores the membership sample in memory, for example memory 206.

Figure 3B:
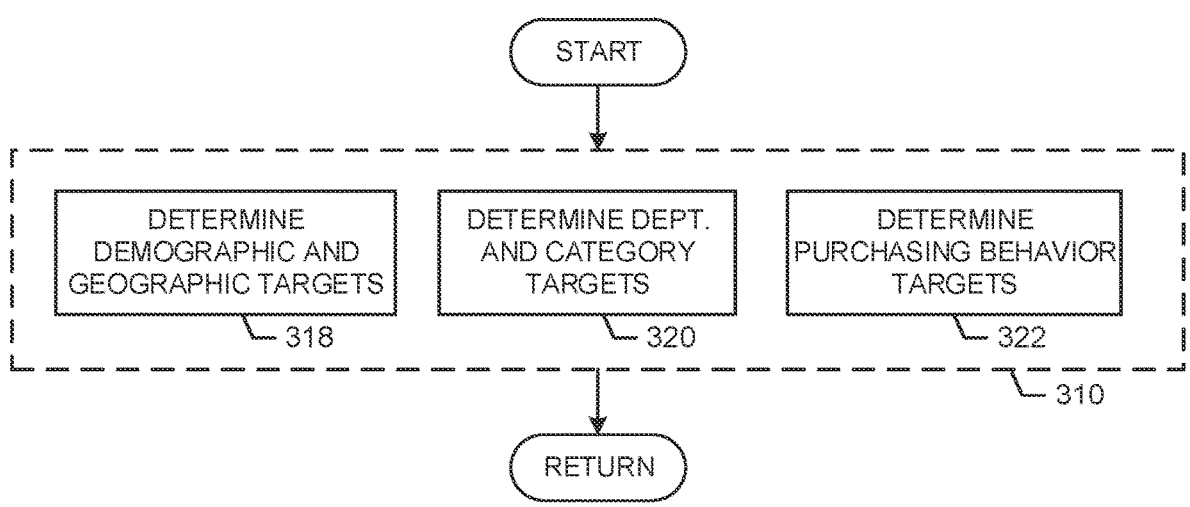
FIG. 3B is a flow chart representative of machine readable instructions for setting the targets of FIG. 3A.

FIG. 3B is a flow chart representative of machine readable instructions for setting the targets (block 310) of FIG. 3A. In the illustrated example, the membership sample selector 204 uses the regional demographic data located in the demographic data storage 108 to determine demographic and/or geographic target(s) for the membership sample (block 318). In the illustrated example, the regional demographic data is provided by, for example, an entity (e.g., The Nielsen Company (US), LLC) associated with the data collection facility 102. The regional demographic data is demographic profile information associated with aggregations of people such as, for example, particular geographic regions (e.g., counties, towns, etc.). Thus, the example membership sample selector 204 uses the regional demographic data to set target(s) for the membership sample such that the membership sample appropriately represents shoppers in the trade areas of the corresponding banners according to demographic and county-level geographic profiles.

In the example of FIG. 3B, the membership sample selector 204 uses the POS database 124 to set department and category targets for the membership sample (block 320). In particular, the membership sample selector 204 analyzes the POS data to identify categories and/or departments of, for example, different banners that demonstrate biases in the membership data. In the illustrated example, the membership sample selector 204 defines targets across a number (e.g., thirty) of categories custom to each banner to appropriately represent total store purchasing. That is, the example membership sample selector 204 of FIG. 3B defines the department and/or category targets such that the categorical and/or departmental biases in the membership card data are accounted for.

In the example of FIG. 3B, the membership sample selector 204 uses the panel product data 110 to set purchasing behavior targets (block 322). For example, the membership sample selector 204 of FIG. 3B determines an average spend target and a spend distribution target for the membership sample. However, the example membership sample selector 204 of FIG. 3B can set targets for any suitable type of purchasing behavior. In the illustrated example of FIG. 3B, the membership sample selector 204, determines an average spend within a particular banner and a spend distribution within that banner and uses that information to tailor the membership sample accordingly. As such, the membership sample selector 204 enables the membership sample to represent a full range of spending behaviors.

As described above in connection with the example of FIG. 2, the membership sample is provided to the example data fuser 208. In some examples, the example data fuser 208 of FIG. 2 accesses the membership sample from memory, for example memory 206. In other examples, the membership sample may be passed directly to the example data fuser 208 by the example membership sample selector 204. The example data fuser 208 of FIG. 2 performs a fusion of the membership sample and the panel product data 110. While the membership sample provides information regarding purchases made at individual ones of the retailers 122, the example consumer data generator 128 is tasked with generating consumer data representative of purchasing behavior across a plurality of retailers. Therefore, the example consumer data generator 128 uses the example data fuser 208 to supplement the membership sample with information from the panel product data 110. As described above, the panel product data 110 corresponds to purchases made by panelists regardless of which retailer at which the purchases occur. Accordingly, the panel product data 110 represents purchasing behavior of the corresponding panelists across retailers.

The example data fuser 208 of FIG. 2 uses the panel product data 110 as donor data, and the example data fuser 208 of FIG. 2 uses the membership sample as recipient data. In the illustrated example, the data fuser 208 matches one or more of the panelists (e.g., the panelist 106 of FIG. 1) with one of the households of the membership sample. The example data fuser 208 of FIG. 2 matches the donor(s) (e.g., from the panel product data 110) with the recipients (e.g., from the membership data) based on, for example, demographic and/or geographic characteristics and/or any other suitable linkage(s). Put another way, the example data fuser 208 utilizes one or more linkage variables to match donor(s) from the panel product data 110 with recipients from the membership data. In the illustrated example, the linking variables focus on geography, demography and purchasing behavior. The linkage variables are correlated with rest-of-market purchasing to fuse the two datasets. The linkages used by the example data fuser 208 of FIG. 2 based on purchasing behavior enables identification of robust statistical associations between donors and recipients.

Figure 4:
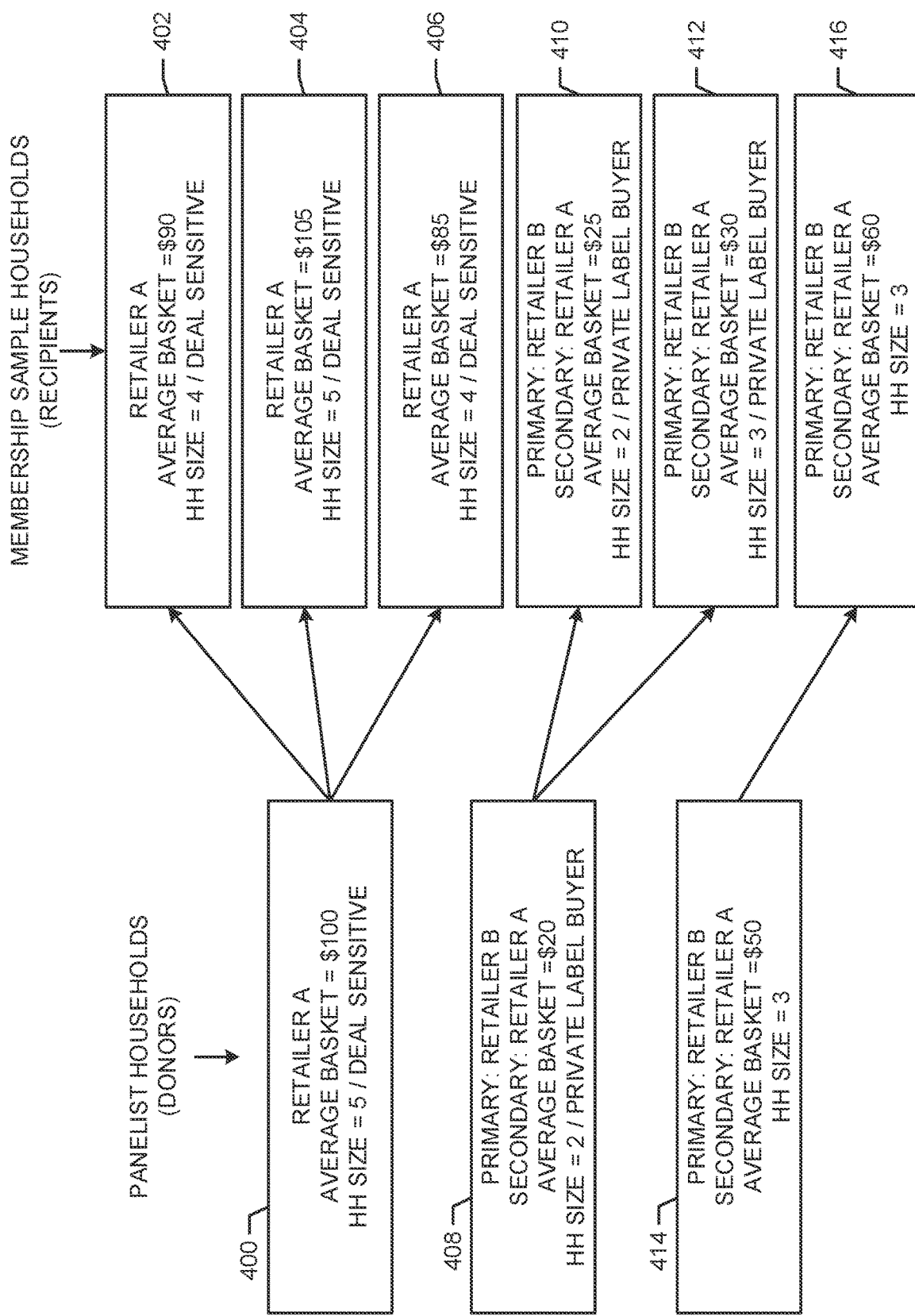
FIG. 4 is a table illustrating example linkages associated with the example data fuser of FIG. 2.

FIG. 4 illustrates an example matching performed by the example data fuser 208 of FIG. 2. In the example of FIG. 4, the data fuser 208 obtains profiles of the panelist households of the panel product data 110. In the example of FIG. 4, a first panelist household 400 is matched with and, thus, acts as a donor for first, second and third households 402-406 of the membership sample. The matching between the first panelist household 400 and the first, second and third households 402-406 of the membership sample is based on one or more similarities (e.g., having values within corresponding thresholds) between one or more aspects of the corresponding profiles. In the example of FIG. 4, the aspects of the profiles that are similar are a frequented retailer, an average basket spend, a household size, and a deal sensitive designation. Additional or alternative aspects and/or characteristics of the profiles can be considered such as, for example, presence and/or age of children, occupation, household age, ethnicity and/or race, presence of pets, education levels, income, ownership of home, renter, basket size, basket assortment, cross category sales rates, PL affinity, primary shopper location, primary banners, household geography, etc. In the illustrated example, the data fuser 208 assigns a weight to individual aspects and/or characteristics based on, for example, how well the respective aspect or characteristic predicts rest-of-market purchasing behavior. For each recipient of the membership sample, the example data fuser 208 of FIG. 2, the best one or more donors is identified based on, for example, the characteristics, optimization of distance scores between the characteristics, and/or optimization of the number of times each donor is used. The example data fuser 208 of FIG. 2 selects a second one 408 of the panelist households as a donor for fourth and fifth ones 410 and 412 of the membership sample households 410. The example data fuser 208 of FIG. 2 selects a third one 414 of the panelist households as a donor for a sixth one 416 of the membership households.

Accordingly, the example data fuser 208 of FIG. 2 attributes the data associated with the donor(s) from the panel product data 110 to the data recipients of the membership sample. In the illustrated example, the fusion performed by the example data fuser 208 includes the panel product data 110 from the donor(s) being appended to the data of the membership sample. As such, the fused data represents the membership transaction data corresponding to single retailers supplemented by transactional data corresponding to similar households (e.g., according to demographics, geographic factors, purchasing behaviors, etc.).

In some examples, the data fuser 208 of FIG. 2 takes into account ongoing research indicative of which linkage variable to use and/or which weights to assign to the linkage variables that more appropriately represent rest-of-market purchasing behavior. In some examples, the data fuser 208 generates and maintains scorecards for the linkage variable that are maintained and updated to track performance of the selected linkage variables. The scorecards used by the example data fuser 208 include, for example, profile metrics and/or buy metrics that measure how well the fused rest-of-market aligns with expectations. In some examples, the evaluation of the linkage variables used by the data fuser 208 includes a split sample validation. For example, as part of the evaluation, the data fuser 208 performs the data fusion on only the panel product data 110, rather than fusing the panel product data 110 and the membership data, by splitting the panel product data 110 into two groups, donors (20%) and recipients (80%). This enables the evaluation performed by the data fuser 208 to analyze one or more metrics for fused recipient data and compare the actual panel product data 110 to determine how well the model is performing. That is, how closely the matching performed by the data fuser 208 is representing expectations and/or how well the matching is preserving relationships in the fused data. For example, for the profile metrics, the data fuser 208 tracks correlation of a percentage point difference between actual and fused distributions across, many different category and/or demographic combinations. For examples, for the buy metrics, the data fuser 208 compares fused data frequencies and/or penetrations in the fused data with data from the original dataset to determine how well the fusion is performing. That is, the example data fuser 208 determines whether one or more profiles of, for example, the retailers, are being maintained through the fusion process.

Thus, the data fuser 208 of FIG. 2 provides a fused dataset that represents the membership sample as supplemented by the panel product data 110. In some examples, the fused dataset is stored in memory, for example memory 206.

Figure 5:
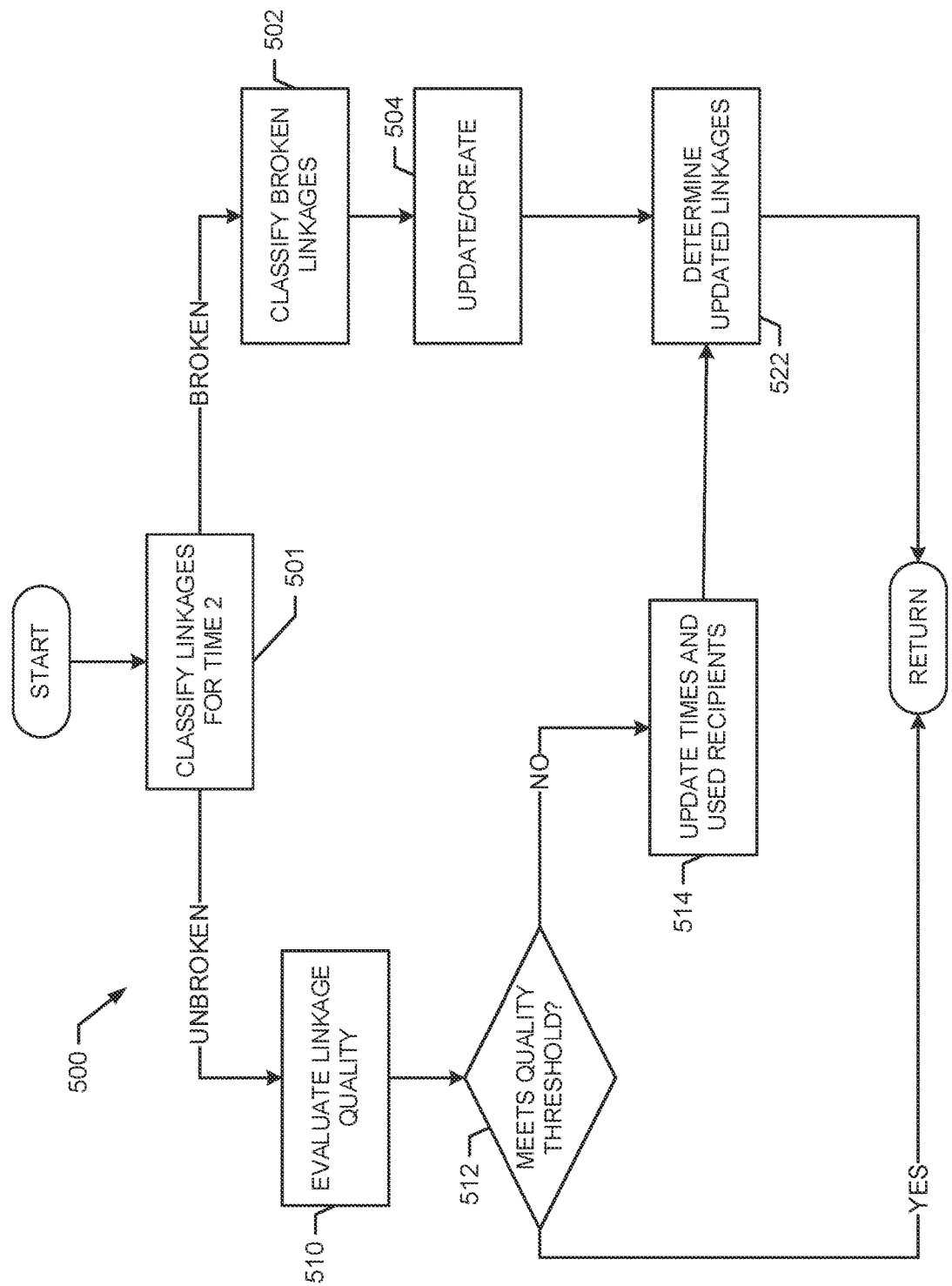
FIG. 5 is a flowchart representative of example machine readable instructions that may be executed to implement the example linkage updater of FIG. 2.

As described above in connection with FIG. 2, the linkage updater 210 performs a maintenance on the linkages utilizes by the data fuser 208. FIG. 5 is a flowchart representative of example machine readable instructions for implementing a process 500 of the example linkage updater 210 of FIG. 2. In the example of FIG. 5, the linkage updater 210 periodically checks the linkages utilized by the example data fuser 208 to determine whether one or more of the matches between donor and recipient are no longer the best available matches. A better donor for a particular recipient may become available due to, for example, panelist households being added to the panel, changes in purchasing behavior of one or more donors and/or recipients, geography and/or demographic updates, one or more of the membership households no longer being filtered out of the membership sample by the membership sample selector 204, etc. The example linkage updater 210 determines whether better candidates are now available and/or whether performance of the linkages (e.g., in maintaining one or more profiles through the fusion process) is unsatisfactory (e.g., according the profile metrics and/or buy metrics used by the data fuser 208 to evaluate the linkage variables and additional metrics designed to detect deterioration in linkages based on increasing distance scores). In the example of FIG. 5, TIME 1 corresponds to the status of the available data at a time of the previous data fusion, while TIME 2 corresponds to a current status of the available data at a time of the periodic maintenance.

In the example of FIG. 5, the linkage updater 210 obtains a linkage file indicative of the linkage variables used at TIME 1, updated recipient data corresponding to the membership sample at TIME 2, and updated donor data corresponding to the panel product data 110 at TIME 2. In some examples, the linkage file, the updated recipient data, and the updated donor data are retrieved from memory, for example memory 206 of FIG. 2. In the example of FIG. 5, the linkage updater 210 analyzes the linkage file to determine, based on the updated recipient data and the updated donor data, whether any of the linkages between donors and recipient in the linkage file 500 is broken (block 501). For example, a donor from the linkage file may no longer be available as a donor. Additional or alternative changes may cause a linkage to be broken.

In the example of FIG. 5, for those of linkages that are broken, the example linkage updater 210 classifies the broken linkages into one of a plurality of scenarios (block 502). The following table (TABLE I) illustrates example scenarios into which the example linkage updater 210 classifies the broken linkages:

TABLE I

Linkage Scenarios

| Donor | Recipient | Action |
|---|---|---|
| Time 1 & Time 2 | Time 1 only | Reduce TU field in TimesUsed - Time 1 file (donor is used one less time for each associated recipient that is no longer present in Time 2), store in TimesUsed - Time 2 file |
| Time 1 only | Time 1 & Time 2 | Include recipient in Submit_Recipient List - Time 2 Remove donor from TimesUsed - Time 2 (donor no longer present) |
| Time 2 only | N/A | Append to TimesUsed - Time 2 file, set TU = 0 (e.g., brand new donor, used for the first time) |
| N/A | Time 2 only | Include in Submit_Recipient List - Time 2 (e.g., brand new recipient, used for the first time) |

As illustrated in TABLE I, the example linkage updater 210 performs one or more updates to data and/or variables used in the data fusion process depending on which scenario is encountered. According to the example of TABLE I, when the linkage updater 210 determines that a particular donor of the panel product data 110 was available at TIME 1 and TIME 2 and that the corresponding recipient from the linkage file is no longer available, the linkage updater 210 reduces a TimesUsed value associated with that donor and stores the updated value for the TimesUsed for that donor in the TIME 2 data. That is, for TIME 2, that donor is used for one less recipient, which may affect how the data fuser 208 selects the donors for the recipients in the data fusion process of TIME 2.

According to the example of TABLE I, when the linkage updater 210 determines that a particular donor was available at TIME 1 but is no longer available at TIME 2, the linkage updater 210 adds the corresponding recipient to a list of recipients that requires a donor for the data fusion process of TIME 2. Further, the example linkage updater 210 removes the donor from consideration for the TIME 2 data fusion process.

According to the example of TABLE I, when the linkage updater 210 determines that a new donor is available for TIME 2 (e.g., a donor not available at TIME 1), the linkage updater 210 adds the donor for consideration for the data fusion process of TIME 2 and sets the corresponding TimesUsed value to zero.

According to the example of TABLE I, when the linkage updater 210 determines that a new recipient is available for TIME 2 (e.g., a recipient not available at TIME 1), the linkage updater 210 adds the recipient to the list of recipients that requires a donor.

In the example of FIG. 5, the linkage updater 210 updates a TimesUsed file associated with the TIME 2 data fusion process and a recipients list file associated with the TIME 2 data fusion process to reflect the appropriate changes from the example of TABLE 1 (block 504).

Returning to block 501, for the linkages that are unbroken, the example linkage updater 210 evaluates a quality of the corresponding linkage (block 510). In the illustrated example of FIG. 5, the linkage updater 210 generates pairwise donor/recipient distance scores for TIME 2. As described above, the characteristics (e.g., demographic, geographic, and/or purchasing behavior) of the donor and/or recipient may have changed since TIME 1 and, thus, the quality of the linkage may have changed. The example linkage updater 210 determines whether any such changes warrant a new, better suited donor being assigned to the recipient. In some examples, this determination by the linkage updater 210 involves comparing a linkage quality metric (e.g., a distance score) to one or more thresholds. In some examples, the linkage updater 210 calculates a distribution of the distance scores and determines which linkages exceed a threshold (e.g., a top one percent of a distribution for three primary views of the data). Put another way, the example linkage updater 210 breaks the linkages that are the most dissimilar such that better suited matches can be made. In the example of FIG. 5, if the linkage does not meet the quality threshold (block 512), the linkage updater 210 breaks the linkage and updates the corresponding TimesUsed file and the recipient list accordingly (block 514).

In the example of FIG. 5, for linkages that meet the quality threshold (block 512), the linkage updater 210 maintains those linkages and sets those linkage apart in a base linkage file. That is, in the illustrated example of FIG. 5, the unbroken linkages that meet the quality threshold do not undergo the data fusion process of TIME 2.

In the example of FIG. 5, the linkage updater 210 maintains importance weights that are used to link the donors to the recipients. In the example of FIG. 5, the linkage updater 210 provides the importance weights to the data fusion process of TIME 2. Using the updated TimesUsed file, the updated recipients list, the updated donor list, and the importance weights, the linkage updater 210 determines updated linkages for recipients requiring a donor using the list of donors and the corresponding numbers of times the donors have been used (e.g., paired with a recipient) (block 522). In the example of FIG. 5, the linkage updater 210 combines the base linkage file and the updated linkages to generate a final linkage file for TIME 2. In some examples, the final linkage file is saved in memory, for example, memory 206 of FIG. 2.

Figure 6:
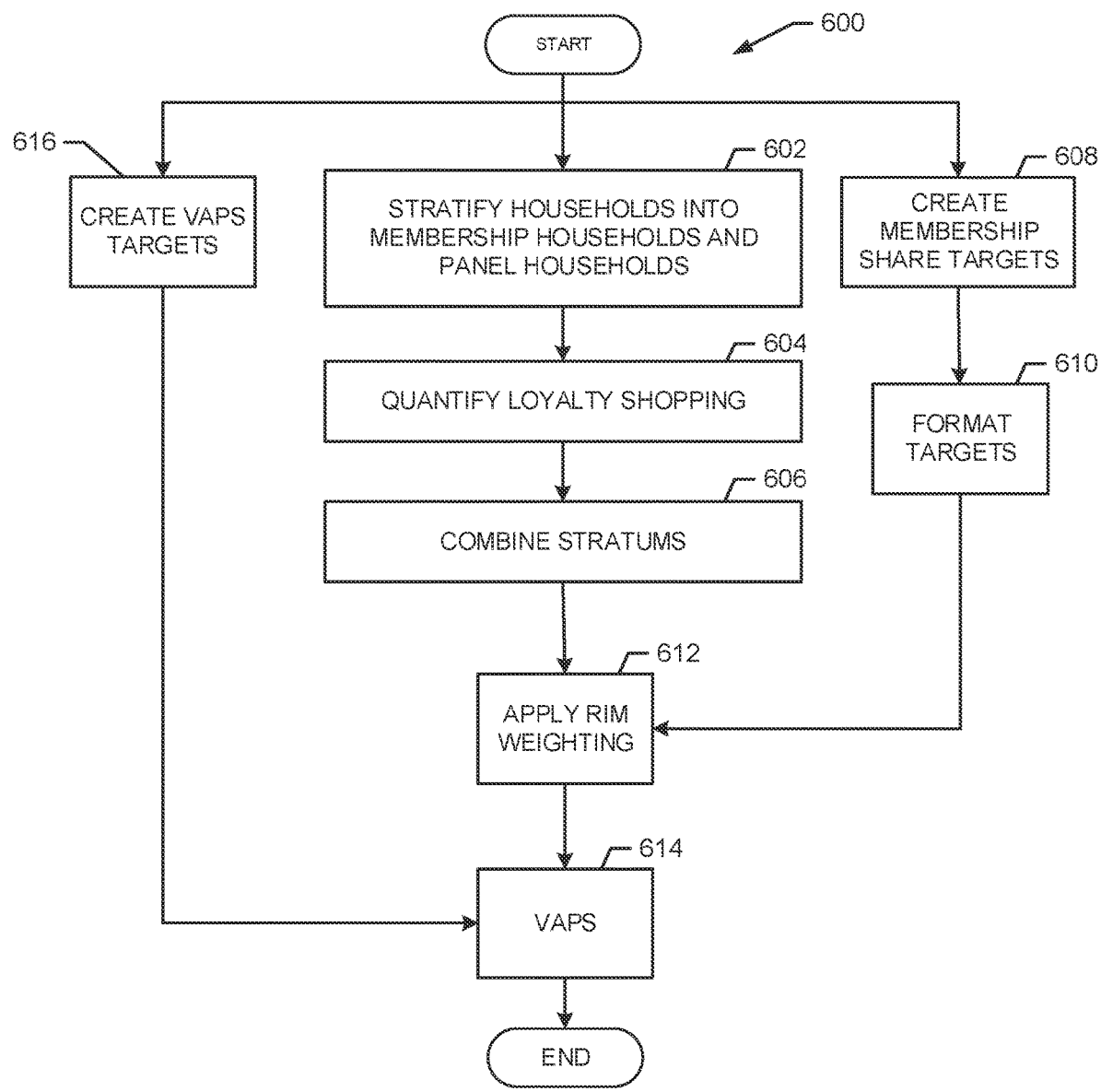
FIG. 6 is a flowchart representative of example machine readable instructions that may be executed to implement the example projection generator of FIG. 2.

FIG. 6 is a flowchart representative of example machine readable instructions for implementing a process 600 of the example projection generator 212. The example projection generator 212 accounts for differences in, for example, sampling rate and purchase levels in the membership data 126 and the panel product data 110. To ensure that retailer penetration and market shares are balanced (e.g., not skewed by differential sampling rates for the membership data and non-membership data), the example projection generator 212 employs a stratification between membership and non-membership data.

In the example of FIG. 6, the projection generator 212 stratifies the panel data associated with the panelist 106 (and other panelists of the panel) into membership households and panel households (block 602). In the example of FIG. 6, the projection generator 212 analyzes the panel households to quantify an amount of shopping each panelist conducts at respective ones of the retailers 122 that implement a membership program (e.g., a loyalty program) (block 604). In the example of FIG. 6, the projection generator 212 treats panel households that do a majority of their shopping at a same one of the retailer 118 as membership households (e.g., even though those households are not technically members in a loyalty program). The example projection generator 212 creates a first stratum (Stratum A) to include the membership households and the panel households performing a majority of their shopping at one retailer. In some examples, stratum A is saved in memory, for example, memory 206. The example projection generator 212 creates a second stratum (Stratum B) to include those of the panel households that do not perform a majority of their shopping at a single retailer. In some examples, stratum B is saved in memory, for example, memory 206. The example projection generator 212 combines the first and second strata (Stratum A and Stratum B) to form a panel sample (block 606), which includes the corresponding household characteristics and the strata designations. In some examples the panel sample is stored in memory, for example memory 206.

In the example of FIG. 6, the projection generator 212 creates share targets for the different strata based on, for example, membership retailer dollar share within a market (block 608). In the example of FIG. 6, the share targets are used to allocate percentages of a market demographic to the first and second strata (Stratum A and Stratum B). In the example of FIG. 6, the projection generator 212 applies the share targets to universe estimates, which are indicative of, for example, estimated demographic and/or geographic distributions in one or more markets. In some examples the universe estimates are stored in memory, for example memory 206. In particular, the projection generator 212 uses the share targets and the universe estimates to generate targets for a RIM (Random Iterative Method) weighting algorithm. Further, the example projection generator 212 formats the targets according to a protocol associated with the RIM weighting algorithm (block 610). The example projection generator 212 executes the RIM weighting algorithm to generate geographic and/or demographic weights for all households in the panel associated with the panelist 106 (block 612). In some examples, the geographic and/or demographic weights are stored in memory, for example memory 206. In the illustrated example, households in the first stratum (Stratum A) are likely to have smaller or lesser weights than households in the second stratum (Stratum B). The geographic and/or demographic weights are provided to a volumetric adjustment projection system (VAPS) 614, which is disclosed in detail below in connection with FIG. 7.

The example projection generator 212 uses the POS data to create volumetric targets for the VAPS system 614 by stratifying the POS data based on, for example, product, channel, geography, time, and market dimensions associated with the first and second strata (Stratum A and Stratum B) (block 616). The following table (TABLE II) illustrates example cells for volumetric targets generated by the example projection generator 212.

TABLE II

| Channel | Product Group | | | |
| --- | --- | --- | --- | --- |
|  | Food | Non-Food | Health & Beauty | General Merchandise |
| Grocery/Loyalty | POS Volumetric Targets | | | |
| Grocery/Non-Loyalty | | | | |
| Drug | | | | |
| Remaining All Outlets | | | | |

In the example of TABLE II, the cells for the volumetric targets are broken down according to product group and channel. However, additional or alternative bases are possible for the volumetric target cells. The example VAPS 614 of FIG. 6 uses the volumetric targets for a calibration process implemented by the VAPS 614, as disclosed in detail below in connection with FIG. 7, to ensure that the data is weighted in accordance with known distributions among the POS data. Further, the example projection generator 212 obtains membership transaction data corresponding to, for example, purchases made in connection with loyalty programs. The membership transaction data is provided to the example VAPS 614. In some examples, the membership transaction data is stored in memory, for example memory 206. As disclosed below in connection with FIG. 7, the example VAPS 614 uses the provided information to adjust, if necessary, weights of the demographically and/or geographically weighted panel data. The resulting information generated by the example VAPS is a plurality of final weights assigned to, for example, the different households associated with the panel product data 110 and the membership data. In some examples, the final weights are stored in memory, for example memory 206.

Figure 7:
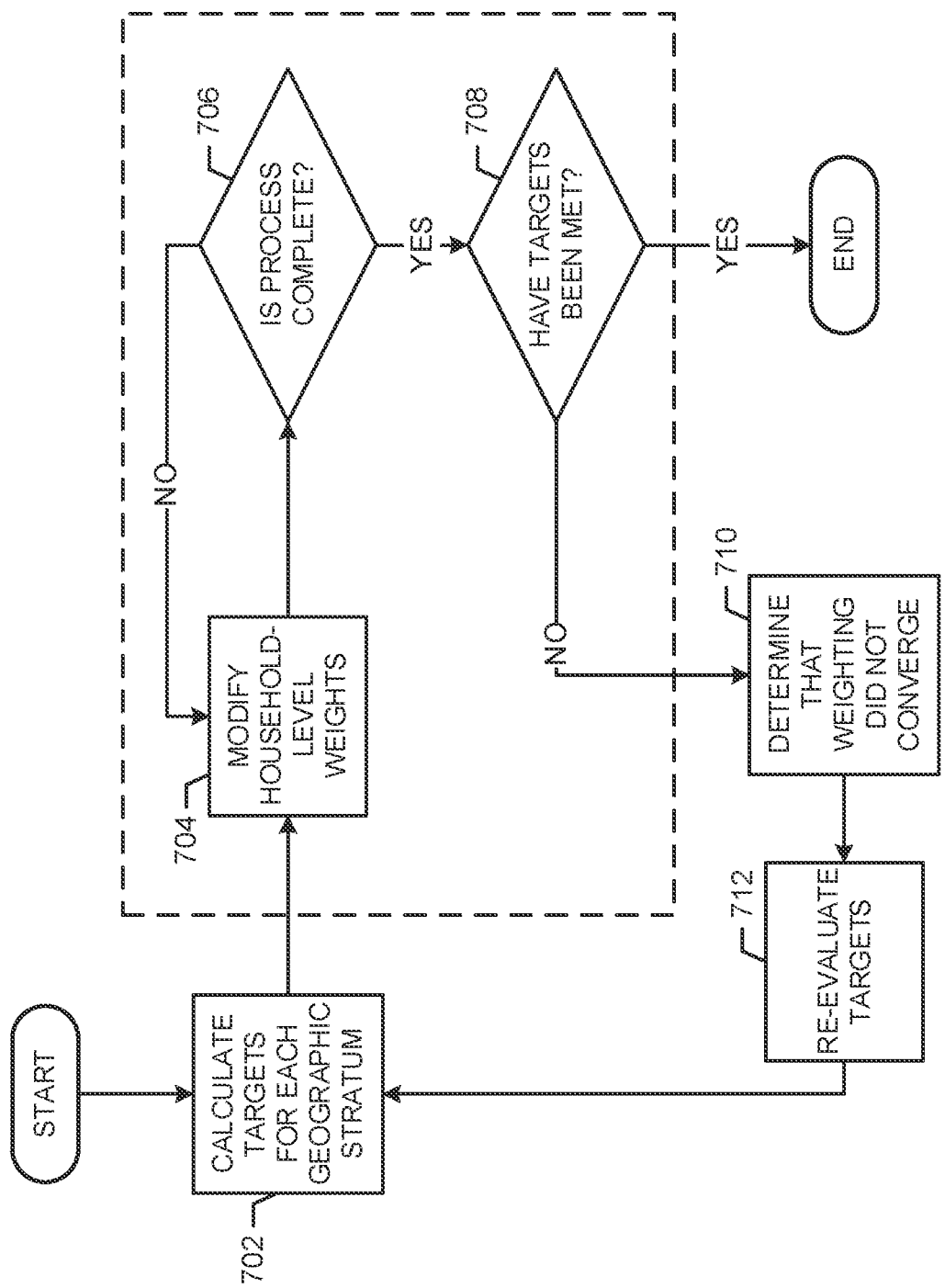
FIG. 7 is a flowchart representative of example machine readable instructions that may be executed to implement the example volumetric adjustment projection system (VAPS) of FIG. 6.

FIG. 7 is a flowchart representative of example machine readable instructions for implementing the example VAPS 614 of FIG. 6. As described above, the VAPS 614 is provided with volumetric targets (e.g., the targets of TABLE II), the membership transaction data, and the weights generated from the RIM weighting algorithm at block 612. In some examples, the volumetric targets, the membership transaction data, and the weights generated from the RIM weighting algorithm are located in memory, for example memory 206. The example VAPS 614 calculates targets for each geographic stratum (block 702). Accordingly, the example VAPS 614 has a plurality of targets to achieve by determining appropriate weights for the purchasing data such that market distributions are appropriately represented. In the example of FIG. 7, the VAPS 614 modifies one or more household-level weights according to the targets (block 704). When the process of modifying the household-level weights is not complete (block 706), the VAPS 614 iteratively continues the modification(s) (block 704). Otherwise, if the process is complete (block 706), the VAPS 614 determines whether the targets have been met (block 708). For example, the VAPS 614 determines whether the household-level data has converged to the targets (e.g., the volumetric targets and/or the targets for the each geographic stratum). If the data has not converged (block 710), the VAPS 614 re-evaluates the targets (block 712). For example, the VAPS 614 determines if adjustments are necessary to one or more the targets based on, for example, an inability of the data to converge. In the example of FIG. 7, control returns to block 702.

Referring back to block 708, if the targets have been met, the example VAPS 614 outputs the corresponding weights. Accordingly, the VAPS 614 generates adjusted or modified weights for the household-level data such that the volumetric targets are represented appropriately in the projections. In some examples, the adjusted or modified weights are stored in memory, for example memory 206.

Referring back to FIG. 2, the reporting system 214 uses weighted fused dataset, which includes the weights generated by the VAPS 614 to, for example, generate one or more projections for larger populations using the membership data and the panel product data 110 as described above.

As described above, FIGS. 3 and 5-7 are flowcharts representative of example machine readable instructions for implementing the example consumer data generator 128 of FIGS. 1 and/or 2. In the examples of FIGS. 3 and 5-7, the machine readable instructions comprise one or more programs for execution by a processor such as the processor 812 shown in the example processor platform 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example programs are described with reference to the flowcharts illustrated in FIGS. 3 and/or 5-7, many other methods of implementing the example consumer data generator 128 of FIGS. 1 and/or 2 may alternatively be used. For example, the order of execution of the blocks may be changed, and/or some of the blocks described may be changed, eliminated, or combined.

As mentioned above, the example processes of FIGS. 3 and/or 5-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3 and/or 5-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 8:
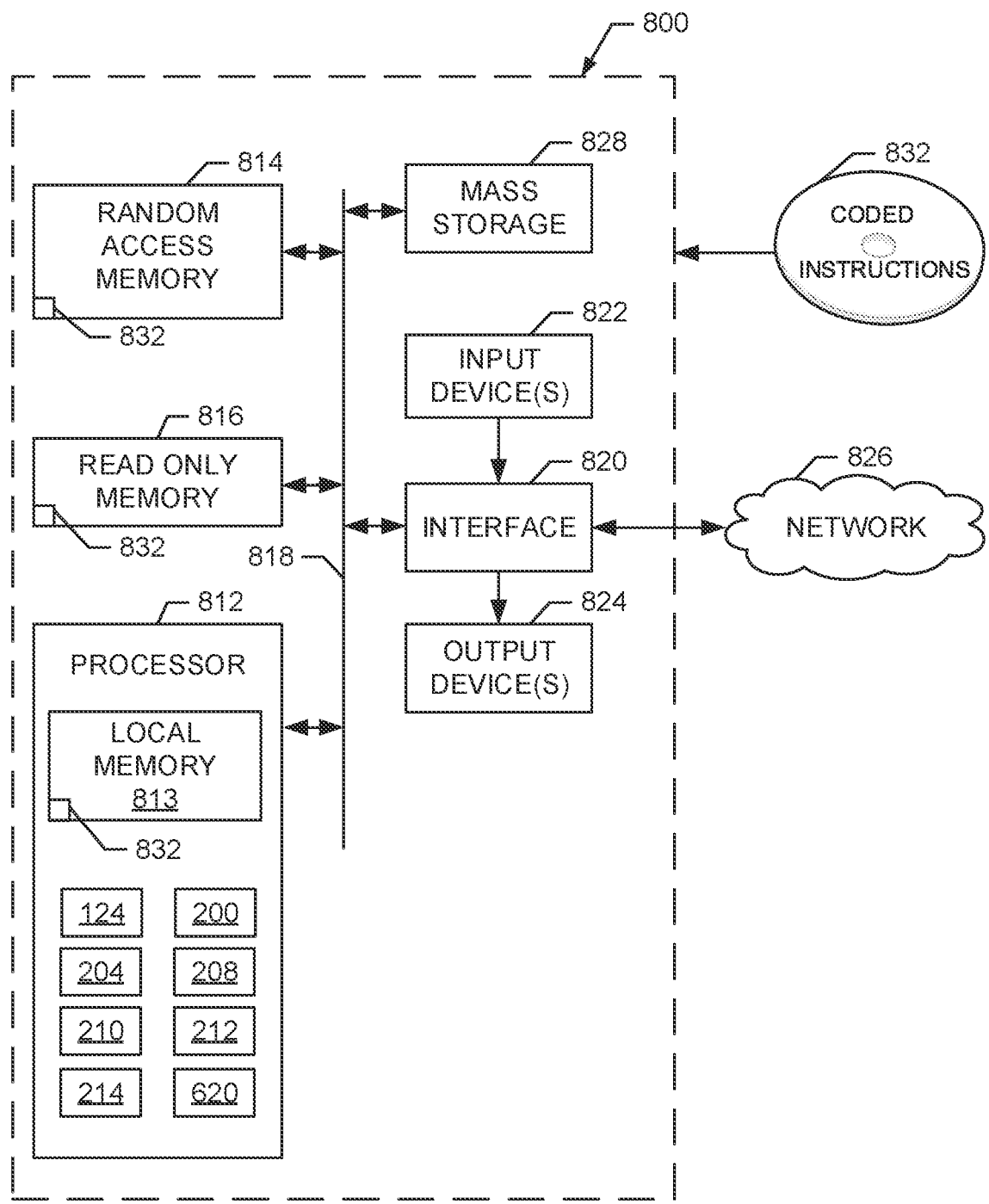
FIG. 8 is a block diagram of an example processing system implementing the example consumer data generator of FIG. 1, the example membership sample selector of FIG. 2 by executing the example machine readable instructions of FIG. 3A, the example data fuser of FIG. 2, the example linkage updater of FIG. 2 by executing the example machine readable instructions of FIG. 5, the example projection generator of FIG. 2 by executing the example machine readable instructions of FIG. 6, and/or the example VAPS of FIG. 6 by executing the example machine readable instructions of FIG. 7.

FIG. 8 is a block diagram of an example processor platform 800 capable of executing the instructions of FIGS. 3 and/or 5-7 to implement the example consumer data generator 128 of FIGS. 1 and/or 2. The processor platform 800 can be, for example, a server, a personal computer, a mobile device (e.g., a cell phone, a smart phone, a tablet such as an iPad®), a personal digital assistant (PDA), an Internet appliance, a media player (e.g., a DVD player, a CD player, a digital video recorder, a Blu-ray player, etc.), a gaming console, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In some examples, the processor 812 implements the example consumer data generator 128 of FIGS. 1 and/or 2, the example matcher 200 of FIG. 2, the example membership sample selector 204 of FIG. 2, the example data fuser 208 of FIG. 2, the example projection generator 212 of FIG. 2, the example linkage updater 210 of FIG. 2, and/or the example reporting system 214 of FIG. 2, the example VAPS 614 of FIG. 6.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device (s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 of FIGS. 3, and/or 5-7 may be stored in the mass storage device 828, in the volatile memory 814, in the non-volatile memory 816, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to prevent transaction data skew, the apparatus comprising:
   memory;
   machine-readable instructions; and a processor to execute the machine-readable instructions to:
identify a first linkage between membership card data associated with a membership program and transaction data associated with panel product data and a second linkage between the membership card data and the transaction data, the first linkage and the second linkage associated with a first time;
detect a change associated with the first linkage between the first time and a second time, the second time earlier than the first time;
responsive to the detection of the change, update the first linkage;
combine the updated first linkage with the second linkage to generate a final linkage file;
select a first portion of a sample of the transaction data for a first type of member of the membership program using the final linkage file, the first portion to satisfy a first target for a characteristic of the sample of transaction data, the first type of member corresponding to a first household type, the first household type associated with first retail purchasing behavior;
generate a second target for a characteristic of the transaction data based on the first portion of the sample of transaction data removed from consideration, the second target different from the first target; and
prevent skew caused by differential sampling rates in the sample of transaction data by selecting (a) the first portion of the sample of the transaction data and (b) a second portion of the sample of transaction data for a second type of member that satisfies the second target, the second type of member corresponding to a second household type, the second household type associated with second retail purchasing behavior.

2. The apparatus of claim 1, wherein the processor is to determine an initial target for a characteristic of a sample of transaction data based on panelist data and retailer data.

3. The apparatus of claim 2, wherein the characteristic of the sample of transaction data includes at least one of an average spend within a banner or a spend distribution within the banner.

4. The apparatus of claim 2, wherein the first portion is to satisfy a first sample size requirement, the first sample size requirement based on point-of-sale data.

5. The apparatus of claim 1, wherein preventing skew due to differential sampling rates includes selecting a second portion of the sample of transaction data for the second type of member that satisfies a second sample size requirement.

6. The apparatus of claim 1, wherein the processor is to apply a purchase threshold filter to filter out portions of the transaction data corresponding to households that do not use a membership card at a threshold frequency.

7. The apparatus as of claim 1, wherein the processor is to apply a geographic filter to the transaction data to filter out membership card data corresponding to card holders that have moved away from a known address associated with a membership card.

8. A non-transitory tangible computer readable medium comprising instructions that, when executed, cause at least one processor to at least:
identify a first linkage between membership card data associated with a membership program and transaction data associated with panel product data and a second linkage between the membership card data and the transaction data, the first linkage and the second linkage associated with a first time;
detect a change associated with the first linkage between the first time and a second time, the second time earlier than the first time;
responsive to the detection of the change, update the first linkage;
combine the updated first linkage with the second linkage to generate a final linkage file;
select a first portion of a sample of the transaction data for a first type of member of the membership program using the final linkage file, the first portion to satisfy a first target for a characteristic of the sample of transaction data, the first type of member corresponding to a first household type, the first household type associated with first retail purchasing behavior;
generate a second target for a characteristic of the transaction data based on the first portion of the sample of transaction data removed from consideration, the second target different from the first target; and
prevent skew caused by differential sampling rates in the sample of transaction data by selecting (a) the first portion of the sample of the transaction data and (b) a second portion of the sample of transaction data for a second type of member that satisfies the second target, the second type of member corresponding to a second household type, the second household type associated with second retail purchasing behavior.

9. The computer readable medium as defined in claim 8, wherein the instructions, when executed, cause the at least one processor to determine an initial target for a characteristic of a sample of transaction data based on panelist data and retailer data.

10. The computer readable medium as defined in claim 9, wherein the characteristic of the sample of transaction data includes at least one of an average spend within a banner or a spend distribution within the banner.

11. The computer readable medium as defined in claim 9, wherein the first portion is to satisfy a first sample size requirement based on point-of-sale data.

12. The computer readable medium as defined in claim 8, wherein the instructions, when executed, cause the at least one processor to prevent skew due to differential sampling rates includes selecting a second portion of the sample of transaction data for the second type of member that satisfies a second sample size requirement.

13. The computer readable medium as defined in claim 8, wherein the instructions, when executed, cause the at least one processor to apply a purchase threshold filter to filter out portions of the transaction data corresponding to households that do not use a membership card at a threshold frequency.

14. The computer readable medium as defined in claim 8, wherein the instructions, when executed, cause the at least one processor to apply a geographic filter to the transaction data to filter out membership card data corresponding to card holders that have moved away from a known address associated with a membership card.

15. A method to prevent transaction data skew, the method comprising:
identifying a first linkage between membership card data associated with a membership program and transaction data associated with panel product data and a second linkage between the membership card data and the transaction data, the first linkage and the second linkage associated with a first time;

detecting a change associated with the first linkage between the first time and a second time, the second time earlier than the first time;

responsive to the detection of the change, updating the first linkage;

combining the updated first linkage with the second linkage to generate a final linkage file;

selecting a first portion of a sample of the transaction data for a first type of member of the membership program using the final linkage file, the first portion to satisfy a first target for a characteristic of the sample of transaction data, the first type of member corresponding to a first household type, the first household type associated with first retail purchasing behavior;

generating a second target for a characteristic of the transaction data based on the first portion of the sample of transaction data removed from consideration, the second target different from the first target; and preventing skew caused by differential sampling rates in the sample of transaction data by selecting (a) the first portion of the sample of the transaction data and (b) a second portion of sample of transaction data for a second type of member that satisfies the second target, the second type of member corresponding to a second household type, the second household type associated with second retail purchasing behavior.

16. The method of claim 15, further including determining an initial target for a characteristic of a sample of transaction data based on panelist data and retailer data.

17. The method of claim 16, wherein the characteristic of the sample of transaction data includes at least one of an average spend within a banner or a spend distribution within the banner.

18. The method of claim 16, wherein the first portion is to satisfy a first sample size requirement based on point-of-sale data.

19. The method of claim 15, further including selecting a second portion of the sample of transaction data for the second type of member that satisfies a second sample size requirement.

20. The method of claim 15, further including applying a purchase threshold filter to filter out portions of the transaction data corresponding to households that do not use a membership card at a threshold frequency.

* * * * *